May 26, 1970 W. D. MILLER ET AL 3,513,979
OIL FILTER MOUNTING
Filed April 3, 1969 2 Sheets-Sheet 1

INVENTORS
WILLIS D. MILLER
JAMES P. WELSH
BY
Fryer, Zimmerwald, Feist, Phillips & Lempio
ATTORNEYS

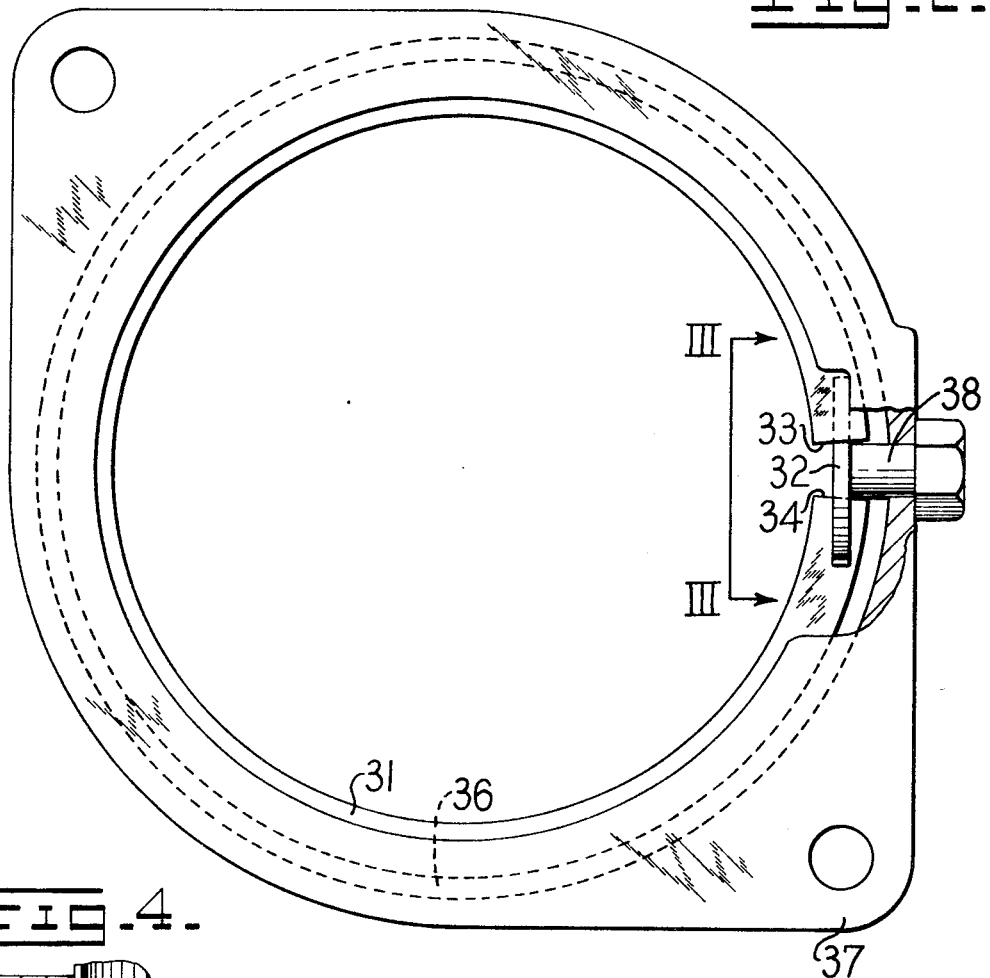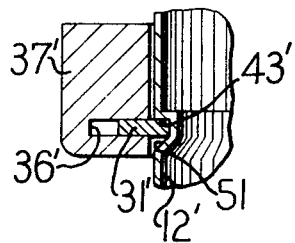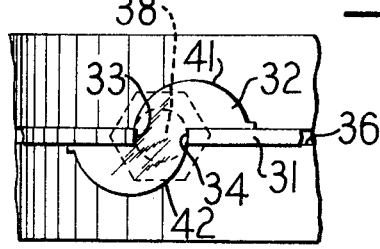

United States Patent Office 3,513,979
Patented May 26, 1970

3,513,979
OIL FILTER MOUNTING
Willis D. Miller, Peoria, and James P. Welsh, Morton, Ill., assignors to Caterpillar Tractor Co., Peoria, Ill., a corporation of California
Filed Apr. 3, 1969, Ser. No. 813,175
Int. Cl. B01d 27/08
U.S. Cl. 210—232                                        3 Claims

ABSTRACT OF THE DISCLOSURE

A mounting for a filter assembly wherein the filter assembly is secured to a filter base by a split ring which is expandible by means of a rotatable cam member to permit removal of the filter assembly from the base.

---

Filter assemblies of the type used, for example, to filter lubricating oil for an engine commonly include a filter element and a case for securing the filter element in place upon a filter base. These filter assemblies must be firmly secured to the base in order to permit proper circulation of the oil or other fluid through the filter element while preventing undesirable leakage. To facilitate servicing of the engine, it is desirable that the filter assembly be readily removable from the base, for example, to permit periodic replacement of the filter element or of the element and case.

Possibly one of the most common prior art mounting arrangements for such filter assemblies include a stud which axially penetrates the case and filter element and threads into the filter base. One particular disadvantage of such an arrangement, which is desired to eliminate by the present invention, is the restriction of the cross-sectional area of inlet and outlet passages for circulating the oil through the filter element. It is also apparent that these studs act in compression along the full length of the case to secure the filter element in place. As larger filter elements are required, the case must be strengthened and larger studs employed to insure proper sealing between the filter assembly and the base.

Still other prior art arrangements include the use of a channel type clamp for securing the filter assembly to the base. Clamps of this type do not interfere with or reduce the area available for circulation of oil through the filter element. However, they do exhibit other disadvantages which may also be considered common to the more usual type of mounting arrangement discussed above. For example, machining and close tolerance requirements which are necessary to assure a seal within the assembly tend to increase overall cost of the filter assembly.

Accordingly, it is an object of the present invention to provide a filter mounting which eliminates or minimizes one or more of the above problems.

It is also a particular object to provide a simple mounting assembly for positively securing a filter assembly in place upon a filter base.

It is also an object of the present invention to provide a mounting assembly for securing a filter assembly in place upon a filter base while providing for rapid replacement of a filter element within the filter assembly.

The manner in which these objects are accomplished as well as additional objects and advantages of the present invention are believed to be apparent in the following description having reference to the accompanying drawings.

In the drawings:

FIG. 2 is a view of the filter base including mounting means for securing a filter assembly in place upon the filter base;

FIG. 3 is a view taken along section line III—III of FIG. 2; and

FIG. 4 is a fragmentary view of a portion of the mounting means as seen, for example, in FIG. 1 and illustrating another embodiment of the present invention.

Figure 1:
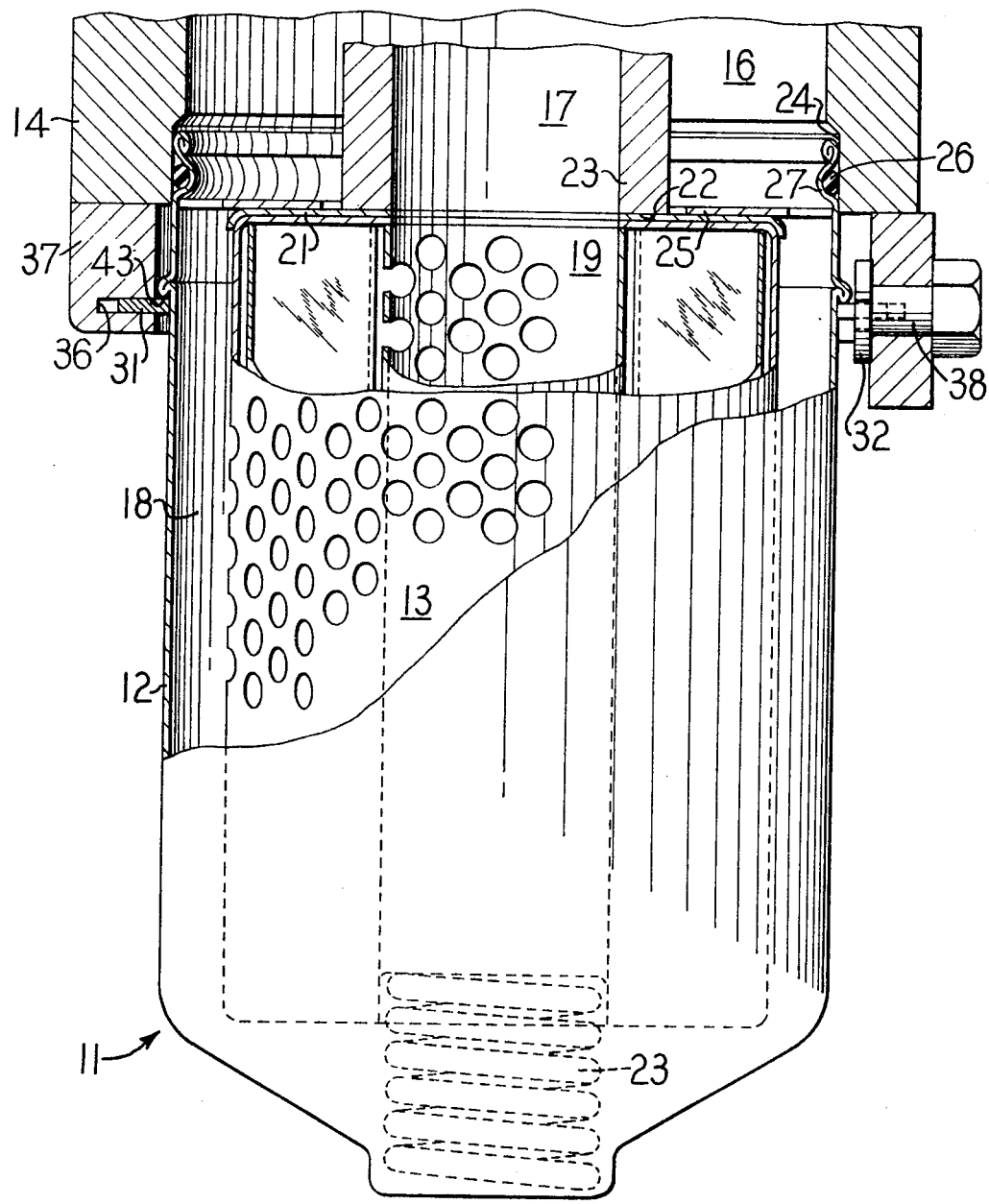
FIG. 1 is an axially sectioned view of a filter assembly secured in place upon a filter base.

The present invention is described below with reference to an exemplary filter arrangement as illustrated in FIG. 1. A filter assembly 11 including a case 12 and a filter element 13 are shown in place upon a filter base 14. The filter base 14 has an annular inlet passage 16 and an axial outlet passage 17 for circulating oil through the filter element 13. The filter base 14 is preferably a portion of a vehicular engine (not otherwise shown) for circulating engine lubricating oil or fluid through the filter assembly.

Since unfiltered oil is delivered by the passage 16 and filtered oil is returned by the outlet 17, it is necessary that these two passages be separated by suitable seals except across the filter element itself. In operation, unfiltered oil from the passage 16 is directed to an annular region 18 between the filter element 13 and case 12. Since oil in the passage 16 is under pressure, it is forced through the filter element 13 and is returned to the outlet passage 17 in a filtered or clean condition by means of an axial passage 19 within the filter element 13. When the filter element is secured in place as shown in FIG. 1, a sealing member 21 which is an integral part of the filter element abuts the end 22 of a cylindrical wall 23 in the base 14 which separates the inlet and outlet passages. When the filter assembly is secured in place, the seal member 21 is maintained in sealing relation by a spring 23 interacting between the case 12 and the filter element 13. To prevent external leakage from the filter assembly, the case 12 fits into a counter bore 24 in the base 14. A sealing ring 26 is maintained in an annular groove 27 formed by the case 12 and is maintained in sealing engagement with the counter bore 24 of the base 14.

The filter assembly shown in FIG. 1 is of a type wherein the element, case and spring are normally replaced as a unit during servicing. Prior to mounting the assembly on the base 14, the element 13 is retained in the case by a ring 25. Movement of the ring 25 out of the case is resisted by the internal projection formed by the groove 27. When the assembly is mounted onto the base 14, the element 13 is urged downwardly against the spring 23 to insure sealing engagement between the annular surface 22 and the seal member 21.

It is readily apparent that the present mounting apparatus is also employable with other types of filter assemblies, for example those where only the filter element is normally replaced during servicing.

The present invention is particularly concerned with a mounting arrangement for securing the filter assembly in place upon the base 14 while permitting the assembly to be rapidly removed from the base and replaced by a fresh filter a assembly. The mounting comprises a split ring 31 and a rotatable cam member 32. These portions of the mounting are also illustrated in FIGS. 2 and 3. The split ends of the ring 31 are illustrated at 33 and 34 in FIG. 2.

The split ring 31 is arranged within an annular slot 36 formed by a retainer ring 37 which is a portion of the base 14. The diameter of the annular slot 36 is sufficiently large so that the split ring 31 only partially fills the slot at least in a relaxed condition. Also, the split ring normally extends radially inwardly from the slot 36 as seen, for example, in FIGS. 1 and 2.

The split ring may be urged completely into the slot 36 by counterclockwise rotation of the cam member 32 as viewed in FIG. 3. The cam 32 is carried by a shaft or bolt 38 which rotatably penetrates the retainer 37. Thus, the cam 32 may be readily rotated by applying a wrench to the bolt 38.

As the cam 32 is rotated in a counterclockwise direction, its cam surfaces 41 and 42 act respectively on the ring ends 33 and 34. As the ends 33 and 34 are spread apart by the cam 32, the ring is expanded into the annular groove 36.

With the ring 31 expanded into the slot 36, the filter assembly 11 may be readily removed from or installed upon the base 14. To then secure the filter assembly in place, the cam 32 is rotated in the reverse direction so that the ring 31 is permitted to return to its normal condition as shown, for example, in FIG. 1. In that condition, the ring engages a shoulder 43 formed on the case 12 to lock the case and filter element 13 in place upon the filter base 14.

Another embodiment of the mounting is partially shown in FIG. 4. Those parts illustrated in FIG. 4 which are similar to parts shown, for example, in FIGS. 1 and 2 are indicated by primed numerals. In this embodiment, the shoulder 43′ is formed as part of an annular slot or indentation 51 in the case 12′. The formation of the shoulder 43′ within the indentation 51 further assists to prevent the entry of foreign material into the assembly since the outer periphery of the case 12′ may then be closely adjacent to the inner periphery of the retainer 37′.

What is claimed is:

1. In a mounting for securing a generally cylindrical filter assembly to a filter base having a hollow portion which receives an end of the filter assembly, the combination comprising a split ring carried by an annular slot formed on an internal surface of the base, a shoulder being formed about the filter assembly end, the split ring tending to engage the shoulder and secured the filter assembly upon the filter base and rotatable cam means associated with the split ring, the cam means being operable to disengage the split ring from the shoulder and release the filter assembly from the filter base, the rotatable cam means being a cam member disposed between split ends of the ring secured to a shaft rotatably penetrating the hollow filter base portion.

2. The invention of claim 1 wherein the shoulder on the filter assembly is one side of an annular slot formed in the filter assembly.

3. The invention of claim 1 wherein the filter base has an inlet passage for delivering unfiltered fluid to the filter and an outlet passage for receiving filtered fluid therefrom and further comprising means for providing a fluid seal for the inlet and outlet passages when the filter assembly is secured upon the filter base.

References Cited
UNITED STATES PATENTS

| | | |
|---|---|---|
| 2,801,764 | 8/1957 | Russell et al. |
| 3,429,448 | 2/1969 | Rosell _____ 210—445 |

REUBEN FRIEDMAN, Primary Examiner

T. A. GRANGER, Assistant Examiner

U.S. Cl. X.R.

210—444

PO-1050
(5/69)

UNITED STATES PATENT OFFICE
CERTIFICATE OF CORRECTION

Patent No. 3,513,979                    Dated May 26, 1970

Inventor(s) Willis D. Miller, et al

It is certified that error appears in the above-identified patent and that said Letters Patent are hereby corrected as shown below:

Column 4, line 2, Claim 1, "secured" should be --secure--.

Column 4, line 8, Claim 1, insert --and-- between the words "ring" and "secured".

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents